Dec. 29, 1964 L. D. GOULD 3,162,970
FISHING ROD HOLDER
Filed July 24, 1963
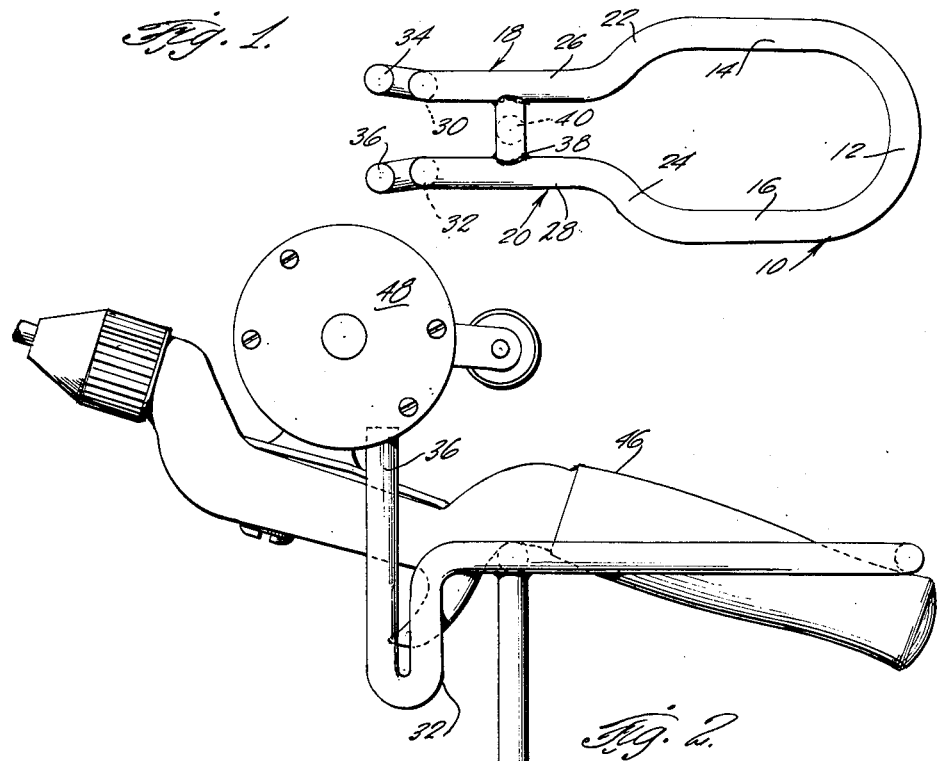
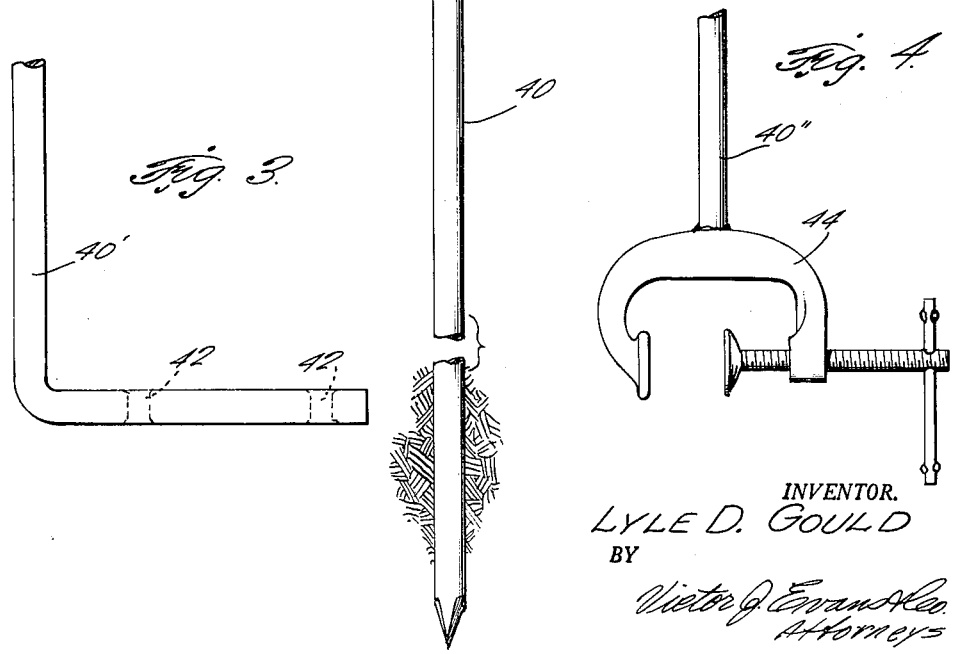
INVENTOR.
LYLE D. GOULD
BY

United States Patent Office 3,162,970
Patented Dec. 29, 1964

3,162,970
FISHING ROD HOLDER
Lyle D. Gould, 1732 Brown Ave., Galesburg, Ill.
Filed July 24, 1963, Ser. No. 297,430
1 Claim. (Cl. 43—21.2)

The present invention pertains to a support or holder for a fishing rod which may be mounted either upon a boat or pier or, in a modified form of the invention, it may be thrust into the ground.

An object of the present invention is to provide a fishing rod support or holder which is new and novel, one having means for holding the handle of a fishing rod whether a spinning reel or casting reel is attached thereto, and one which is highly effective in action.

Another object of the present invention is to provide a fishing rod holder which is easily fabricated from common bar stock, one which may be manufactured on metal bending equipment, and one which is economically feasible.

These and other objects and advantages of the present invention will be fully apparent from the following description when taken in connection with the annexed drawing, in which:

FIGURE 1 is a top plan view of the fishing rod holder according to the present invention, FIGURE 2 is a side elevational view showing the handle of the fishing rod installed in the holder of the present invention, FIGURE 3 is a fragmentary elevational view showing a modified form of the support for the holder of the present invention, and FIGURE 4 is an elevational view of a further type of support to be employed with the holder of the present invention.

Referring in detail to the drawing in which like numerals indicate like parts throughout the several views, the fishing rod holder of the present invention comprises a horizontally disposed U-shaped element 10 having a bight 12 and legs 14 and 16 extending from the ends of the bight 12.

Extensions 18 and 20 project from the free ends of the legs 14 and 16, respectively, and the extensions 18 and 20 have inwardly turned portions 22 and 24, respectively. One end of the portion 22 merges with the free end of the leg 14 and one end of the portion 24 merges with the free end of the leg 16.

The extensions 18 and 20 include straight parallel spaced portions 26 and 28 which have their one ends merging with the free ends of the inwardly curved portions 22 and 24, respectively.

The portions 26 and 28 terminate at their other ends remote from the curved portions 22 and 24 in vertically depending portions 30 and 32, respectively, as shown most clearly in FIGURE 2.

The lower ends of the portions 30 and 32 merge with the lower ends of terminal portions 34 and 36 which extend vertically and terminate at a point spaced above the horizontally disposed U-shaped element 10.

A cross bar 38 extends between and has its ends secured to the portions 26 and 28 intermediate the ends thereof and serves as a means for supporting the holder of the present invention above a supporting surface. Depending from the cross bar 38 is a support means shown in FIGURE 2 to be a spike 40 adapted to be driven into a ground surface.

In the form of the invention shown in FIGURE 3 the spike 40' is adapted to be secured by suitable fastening means such as wood screws to the portion of a boat adjacent the water such as the gunwale, the portion 40' being bent at right angles and provided with apertures 42 for the insertion therethrough of wood screws or the like.

In the form of the invention shown in FIGURE 4 the shank 40" is provided with a clamp 44 on its lower end for securement of the shank 40" to a vertical edge such as the gunwale of a row boat or a part of a water edged structure such as a dock or pier.

In use, the fishing rod holder according to the present invention may be used to support a fishing rod handle, as at 46 in FIGURE 2, with a portion of the handle underlying the bight 12 of the U-shaped element 10 and with a portion of the fishing rod adjacent the handle 46 lying on the cross bar 38.

The spacing of the portions 34 and 36 are such that they fit within and engage the inner surfaces of the reel 48 and keep the reel 48 from turning sideways when supported in a holder of the present invention.

While only preferred embodiments of the present invention are shown and described, it is understood that numerous changes and modifications may be made in the invention without departing from the spirit thereof as set forth in the appended claim.

What is claimed is:

A fishing rod holder comprising a horizontally disposed U-shaped element, the bight thereof being adapted to overlie the free end portion of the handle of a fishing rod with the handle extending between the legs of said element, an extension projecting from the free end of each of said legs, said extensions having inwardly turned portions contiguous to said legs and straight spaced parallel portions remote from said legs, each of said extensions having a vertically depending portion merging at its upper end with the free end of the adjacent straight portion and having an upwardly turned end portion adapted to straddle the handle and merging at its lower end with the free end of said depending portion, the upper end of each of said end portions being spaced above said U-shaped element for engaging a fishing line reel, a cross bar extending between and secured to said extension parallel portions, and support means depending from said cross bar, said cross bar being adapted to engage the portion of a fishing rod adjacent the handle thereof when said handle is disposed between the legs of said element.

References Cited by the Examiner
UNITED STATES PATENTS
2,059,921  11/36  Weiss _____ 248—38
FOREIGN PATENTS
206,395   2/57   Australia.
570,606  12/57   Italy.

ABRAHAM G. STONE, *Primary Examiner.*